United States Patent

Fedon

Patent Number: 5,715,747
Date of Patent: Feb. 10, 1998

[54] DEVICE FOR TREATING A HETEROGENEOUS MIXTURE, ESPECIALLY HONEY AND WAX

[76] Inventor: Jean Fedon, Route Nationale 20, F-87640 Razes, France

[21] Appl. No.: 591,303

[22] Filed: Jan. 25, 1996

[30] Foreign Application Priority Data

Jan. 31, 1995 [FR] France ................................ 95 01302

[51] Int. Cl.⁶ ........................................................ B30B 9/14
[52] U.S. Cl. .......................... 100/90; 100/117; 100/127; 100/130; 100/131; 100/148
[58] Field of Search ........................... 100/90, 91, 117, 100/125–127, 130, 131, 145–150

[56] References Cited

U.S. PATENT DOCUMENTS

| | | | |
|---|---|---|---|
| 332,718 | 12/1885 | Lafferty | 100/145 |
| 1,527,911 | 2/1925 | Patti | 100/148 |
| 1,902,738 | 3/1933 | Tuttle | 100/149 |
| 2,415,600 | 2/1947 | Meakin | 100/148 |
| 3,459,121 | 8/1969 | Rossiter | 100/148 |
| 3,982,483 | 9/1976 | Bird et al. | 100/148 |
| 4,121,967 | 10/1978 | Reinhall | 100/148 |
| 4,328,743 | 5/1982 | Fager | 100/49 |
| 4,520,724 | 6/1985 | Costarelli | 100/117 |
| 4,781,823 | 11/1988 | Shinozaki | 100/117 |

FOREIGN PATENT DOCUMENTS

| | | | |
|---|---|---|---|
| 390 864 | 7/1990 | Austria . | |
| 1527009 | 5/1968 | France | 100/117 |
| 26177 | 2/1884 | Germany | 100/125 |
| 519594 | 3/1931 | Germany | 100/147 |
| 27 36 810 | 3/1978 | Germany . | |
| 499020 | 11/1954 | Italy | 100/117 |
| 234198 | 9/1944 | Switzerland | 100/130 |

*Primary Examiner*—Stephen F. Gerrity
*Attorney, Agent, or Firm*—Young & Thompson

[57] ABSTRACT

A device for treating a heterogeneous mixture and more particularly for separating wax and honey in a mixture obtained following an uncapping operation. The device includes a feed hopper (18) opening onto a sleeve (12) fitted with holes (26) in which an Archimedes screw (14) is disposed and driven in rotation by a motorized system (16), solid evacuation elements (20) and liquid recovery elements (22).

8 Claims, 3 Drawing Sheets

DEVICE FOR TREATING A HETEROGENEOUS MIXTURE, ESPECIALLY HONEY AND WAX

FIELD OF THE INVENTION

The present invention concerns a device for treating a heterogeneous liquid/solid mixture, especially a mixture of wax and honey when a honey crop is involved.

BACKGROUND OF THE INVENTION

The cropping of honey is effected from flames contained in beehives and disposed parallel to one another.

The frames are initially equipped with wax sheets from which the bees build hexagonal housings in which they place the honey, each housing constituting a small container. Of course, these housings do not strictly have the same height and there are housings which project to some extent on both sides of the median plane of the fame, the housings being sealed off by the bees with wax.

The first operation for recovering the honey consists of uncapping these housings.

There are machines to carry out this recovery at rates compatible with the volumes derived from large-scale manufacture.

These machines include a perforated wire mesh type belt conveyor and elastic fingers mounted rotatably on shafts whose spin axis is parallel and transversal with respect to the belt conveyor. The elastic fingers, generally metallic slats, rub the surface of the frames and uncap the housings.

The uncapped flames are then treated by means of hydro-extraction so as to extract the honey existing in the housings.

During the first uncapping operation, the operator gathers under the perforated belt by means of simple gravity a mixture of wax and honey to be processed so as to separate the two substances.

Firstly, the honey gathered forms part of the production, and its recovery is essential if it is desired to increase the yield, and secondly the wax needs to be recovered in order to reuse it.

The recovered wax is normally melted so as to obtain wax cakes which are either industrially transformed to incorporate it in certain products. Alternatively, the melted wax is sent to outworkers to produce sheets for relining the frames with a view to placing into production in super beehives.

The problem is to obtain a honey with the least possible amount of wax and recover the wax in a solid form free, from any honey at reduced costs. In this honey medium, having regard to the fact that the honey is adhesive and may crystallize, simple and reliable equipment is required. The equipment also needs to consume less energy and be able to treat large volumes with a continuous functioning so that this operation is no longer as expensive as the treatment in the prior art.

Moreover, it is important that this equipment is used by the actual operators present on the production site. Thus, it needs to be simply designed and not requiring frequent operator intervention.

Working at extreme temperatures is excluded as it would modify the organoleptic qualifies of the honey. Consequently, the working should take place at ambient temperature.

Honey is also a thixotropic medium and because of this, it is advantageous that it is worked at approximately the same temperature so that its viscosity remains constant and that separation is of good quality.

SUMMARY OF THE INVENTION

With this aim in mind, the present invention concerns a device for treating a heterogeneous liquid/solid mixture so as to separate the liquid from the solid whilst ensuring the compression of the solid, this device only requiring a minimum amount of energy, working continuously or semi-continuously and only requiring a minimum personnel. That is a minimum portion of the personnel time required by the other production devices.

The result obtained leads to a sufficiently effective separation of the liquid and the solid so that the two substances can be used directly, as in the particular example of honey and wax, the latter no longer needing to be melted.

To this effect, according to the invention, the device for treating a heterogeneous mixture and more particularly for separating the wax and honey in a mixture obtained following an uncapping operation is characterized in that it includes a feed hopper opening onto a sleeve fitted with holes in which an Archimedes screw is disposed and driven in rotation by a motorized system, solid evacuation means and liquid recovery means.

According to a preferred embodiment, the screw includes at least one compression zone with a tighter pitch disposed behind the screw feed zone.

The sleeve includes holes with a reduced frequency from upstream towards downstream.

In addition, material nonreturn means are provided along the screw.

According to the invention, the liquid recovery means include a box and a grate disposed under the sleeve over its entire length and the solid evacuation means include a passage hole fitted in a plate integral with the frame and the sleeve, and an adjustable disk adapted to seal off said passage hole.

According to one particular characteristic, the feed hopper includes a pre-dripping grate with slant adjustment means a.

Advantageously, the invention includes magnetized bars placed on the pre-dripping grate for retaining the metallic particles and a safety grate.

According to a preferred embodiment of the invention, the screw is rotatably rotary with respect to the frame by means of a bearing and is fixed in a longitudinal translational direction so as to ensure the picking up of stresses.

BRIEF DESCRIPTION OF THE DRAWINGS

The present invention is now described on the basis of a particular non-restrictive preferred embodiment shown on the accompanying drawings, wherein.

DETAILED DESCRIPTION OF THE PREFERRED EMBODIMENTS

Figure 1:
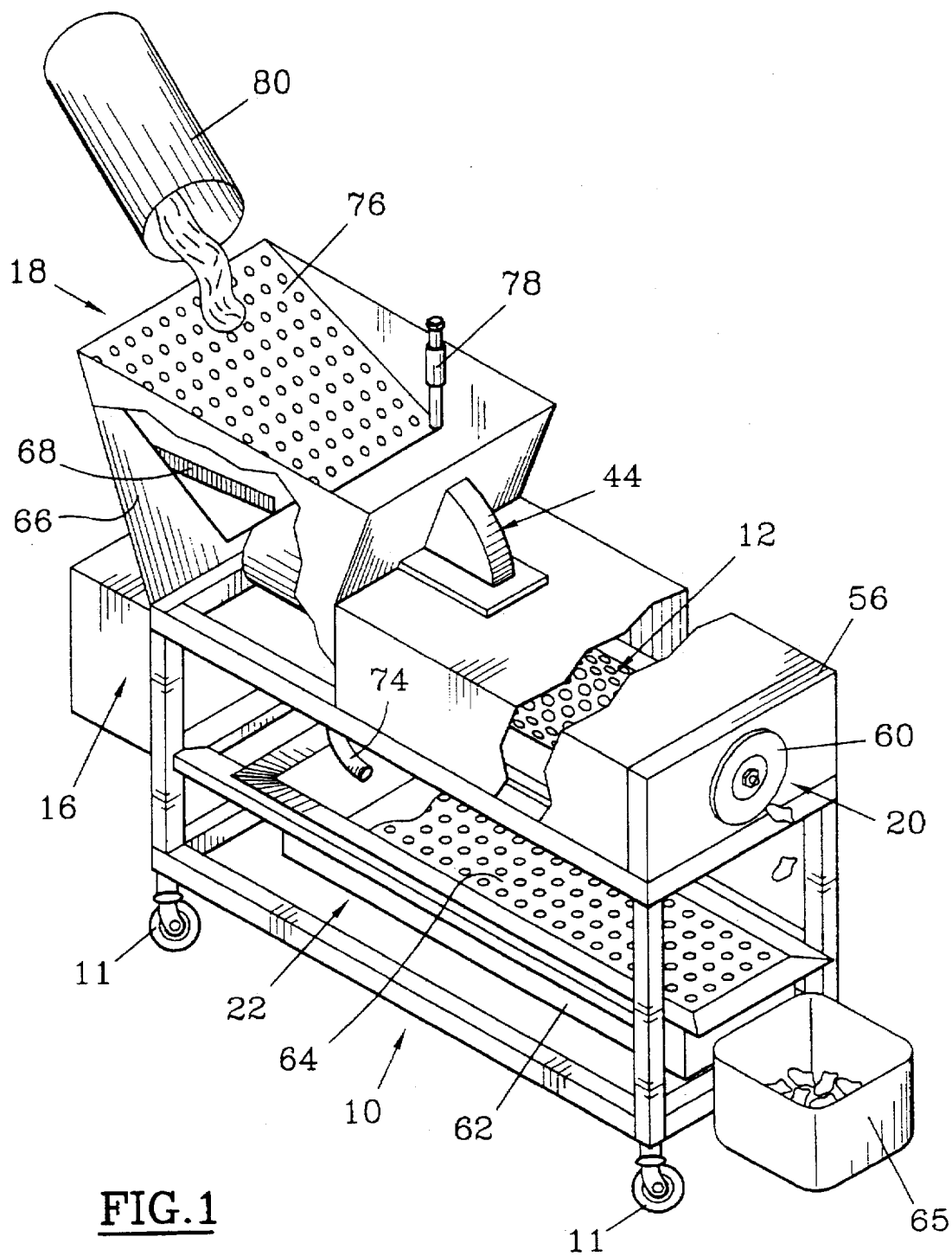
FIG. 1 is a diagrammatic perspective view of a device conforming to the invention with a partial exposed portion.

FIG. 1 shows an extremely stiff frame 10 mounted on wheels 11 so as to render it movable.

Figure 2:
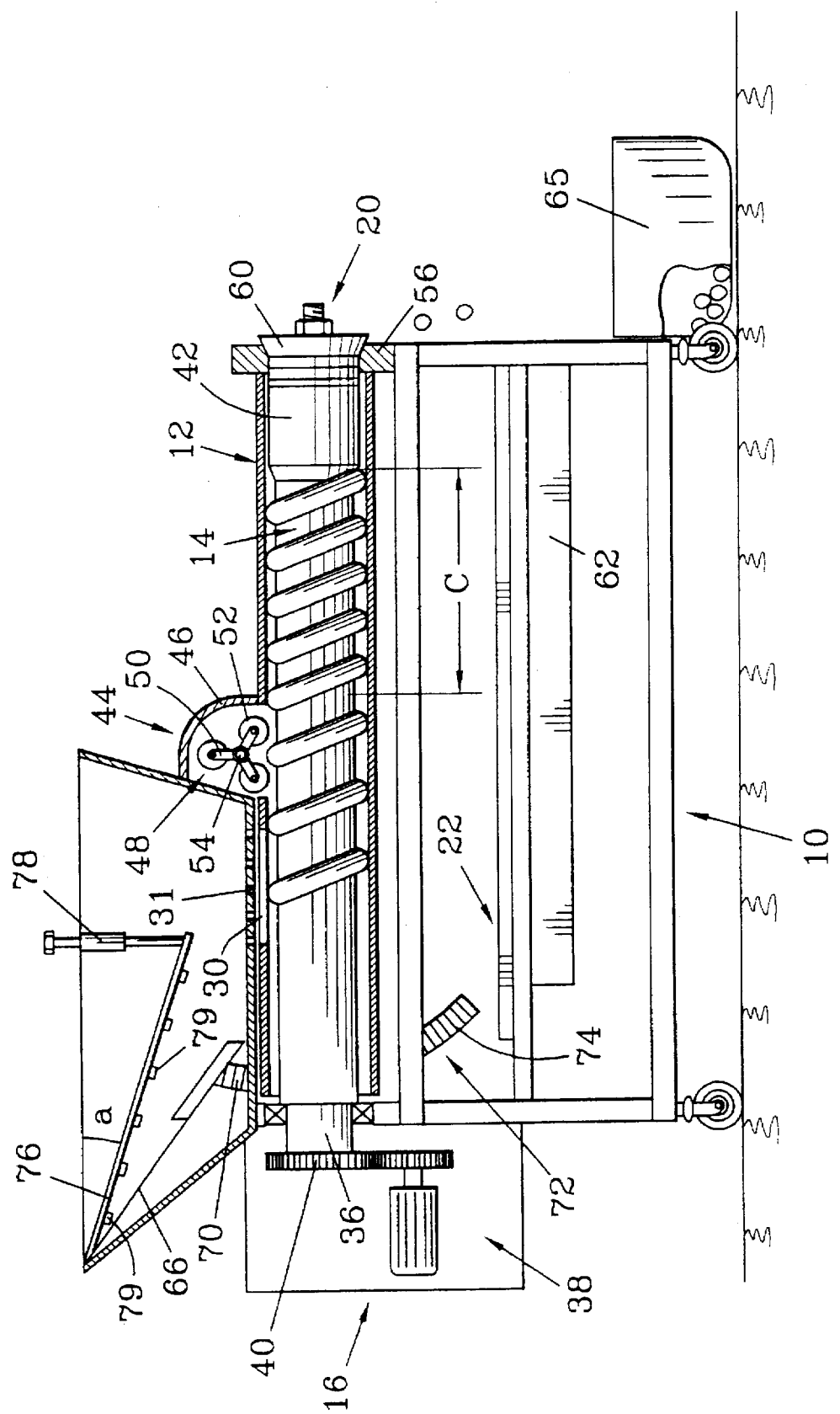
FIG. 2 is a median longitudinal cutaway view through a vertical plane of the device of FIG. 1.

The principal portions of this device are the sleeve 12 and its screw 14 visible on FIG. 2, the motorized system 16, the feed hopper 18, the solid evacuation means 20 and the liquid recovery means 22.

Figure 3:
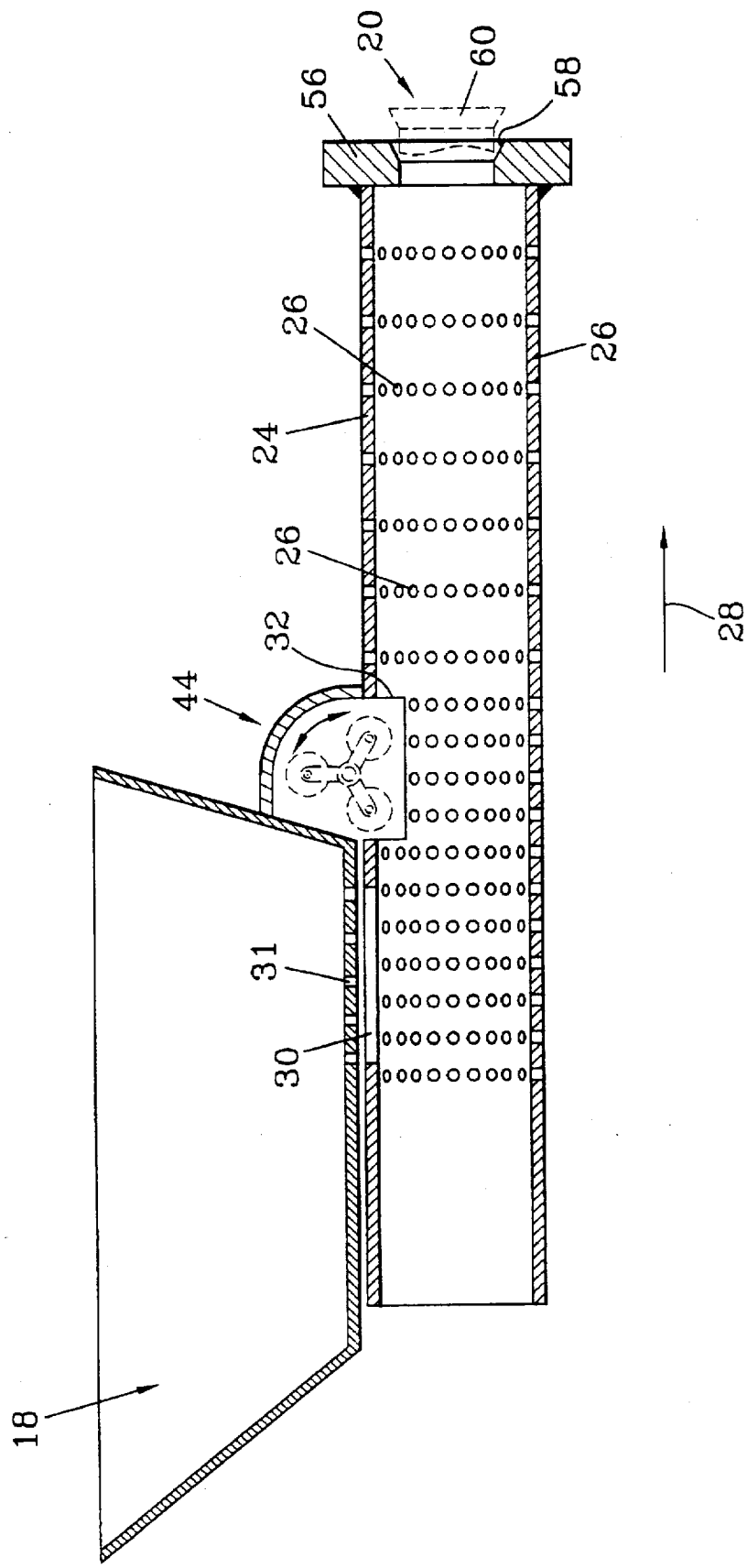
FIG. 3 is a simplified diagrammatic view of the sleeve with the screw removed.

The sleeve is shown in detail on FIG. 3. It includes a metallic tube 24 perforated with sets of holes 26 regularly spaced over the periphery, the number of holes reducing from upstream to downstream in a direction represented by the arrow 28.

This tube includes an opening 30 at the right of the hopper, as well as a second opening 32 at the right of the non-return means 44 described later. Moreover, the hopper 18 includes an opening coupled with the opening 30 of the metallic tube, this opening being access protected by a protection grate 31.

The screw 14 shown on detail on FIG. 2 is of the Archimedes type and rotates in the sleeve which ensures its guiding. The upstream end 36 is axially maintained so as to pick up the axial forces when it is rotatably mounted with respect to the frame by means of a bearing. The motorized system 16 includes a back-geared motor 38 which cooperates with a gear 40 integral with the upstream end of the screw.

The downstream end 42 extends to the right as far as the solid evacuation means 20, the sleeve being integral with the evacuation means.

The screw has special features since the pitch varies along the longitudinal axis and a compression zone C is provided in which the screw's pitch is constant but tighter. This zone is situated immediately behind the non-return means 44.

These nonreturn means 44 include a box 46 which houses a 48 comprising three arms 50, a pallet 52 being disposed at the end of each of said arms and whose plane is orientated longitudinally.

The three arms are combined on a given transverse axis 54 with an angular equidistribution. This axis is mounted free in rotation.

The size and shapes of the pallets and the distance from the transverse axis 54 with respect to the longitudinal axis of the screw are such that the pallets cooperate with the bottom of the screw thread.

The profile of the screw at its downstream end 42 is modified by suppressing the thread and increasing the diameter so as to leave a limited volume between the screw and the sleeve and increase compression.

The solid evacuation means 20 include a plate 56 integral with the frame 10 and the sleeve 24 and fitted with a passage hole 58 whose diameter is approximately equal to the diameter of the sleeve and whose periphery is externally beveled.

A disk 60 is mounted and is axially adjustable by means of a screw/nut unit with respect to the plate 56. This disk is beveled on its periphery with a profile corresponding to that of the passage hole, which enables the outlet opening to be adjusted.

The liquid recovery means include a movable box 62 mounted in support on the frame 10, said box being surmounted by a fine separation grate 64. The box is situated under the sleeve and extends over its entire length.

At the downstream end, a recovery box 65 is disposed at the right of the evacuation means 20 so as to collect the compressed wax at the outlet of the passage hole 58.

On the three figures, all the main elements of the feed hopper 18 are shown.

This hopper includes a slanted recovery wall 66 which includes a guide 68 and an evacuation orifice 70 extended by a flexible flow pipe 72 whose free end 74 is located above the grate 64 of the box 62.

Disposed above this slanted recovery wall is a pre-dripping gate 76 whose angle a is adjustable by screws 78 engaged on the edges of the hopper. This grate includes magnetized bars 79 secured to its lower face so as to retain the particles and metallic bodies which would be located on this grate.

The grate opens at its lower portion at the right of the hole 30 provided in the sleeve and the mixture falls onto the screw, as shown diagrammatically on FIG. 2.

FIG. 1 also shows a pouring receptacle 80 which may also be a feed pipe derived from an uncapping machine operating nearby.

The functioning of the device described above is explained hereafter and shows all the advantages concerning this embodiment.

The operator pours the heterogeneous mixture of honey and uncapping wax particles contained in the receptacle 80 on the grate 76 of the hopper 18. Most of the honey flows through the grate. An adjustment of the inclination a makes it possible to adjust the flow speed of the mixture on the grate according to the viscosity of this mixture.

The magnetized bars 79 can retain the nails and clips which may be driven during the uncapping operation.

The flowed honey is collected by the slanted wall 66 and the guide 68 and is then evacuated by the flexible pipe 72 into the box 62 after said honey has been finally filtered through the fine grate 64 disposed above the box.

The flowed mixture at the right of the end of the grate 76 of the hopper falls into the opening 30 of the sleeve 24.

Once started, the back-geared motor 16 drives the screw in rotation and the honey flows via gravity through the holes 26 of the sleeve from the first pitches and then the pitch contracts with the result that the contents of the sleeve compress at the right of the zone C.

At the time of operation, a <<plug>>needs to be created, that is it is necessary to fill the volume between the screw and the sleeve as far as the disk 60 which halts the movement of the wax creating a counter-pressure. The device is also made to rotate without immediately producing any wax.

At this point, the nonreturn means 44 come into action.

The pallets rotate at the end of their arms around the spindle 54. In fact, the pallets are guided by the thread of the screw. At the same time they prevent the wax from rotating with the screw without moving longitudinally and returning backwards.

The compressed wax is strongly pressed and any remaining honey flows-through the holes of the sleeve.

The reduction of the number of holes on the periphery makes it possible to give the wax its coherence which is completed in the smooth downstream portion of the screw whose diameter is increased.

The wax is then evacuated in the form of compressed fragments between the passage hole 58 and the disk 60.

The spacing of the disk with respect to the passage hole makes it possible to vary the compacting pressure.

The screw is axially pushed upstream but its mounting with respect to the frame prevents any longitudinal movement of the screw.

It is possible to provide a clean housing (no reference) partially shown on FIG. 1.

The device of the invention functions with a minimum of assistance provided by an operator and scarcely needs any technical intervention when the feeding of the hopper is effected continuously by a flexible pipe from the uncapping machine.

Tests have shown that the wax obtained is able to be also used directly by outworkers as in industrial application.

As for the honey, it is purified sufficiently so as to be associated with the honey derived from hydro-extraction. Normal flocculation and decantation allow for final refining which renders the honey ready for consumption.

I claim:

1. Device for separating wax and honey in a mixture obtained following an uncapping operation, the device including a frame and comprising:

a feed hopper for receiving the honey and wax mixture, said feed hopper opening onto a sleeve perforated with holes;

an Archimedes screw disposed inside said sleeve and driven in rotation by a motorized system;

non-return means within the sleeve cooperating with the screw for preventing backflow of the honey and wax mixture;

means positioned downstream of said material non-return means for compressing wax;

means for evacuating compressed wax from a downstream end of the sleeve, said evacuating means including a passage hole fitted in a plate integral with the frame and the sleeve, and a disk having a profile corresponding to that of the passage hole, said disk being mounted with respect to the plate, and including means for moving said disk in an axial direction of the sleeve to adjust the size of the passage hole; and means for recovering honey expressed through the holes of the sleeve.

2. Device according to claim 1, wherein the means for compressing wax comprises a portion of said screw having a tighter pitch disposed downstream from a screw feed zone thereby defining at least one compression zone.

3. Device according to claim 1, wherein the number of holes on the sleeve decreases from upstream to downstream.

4. Device according to claim 1, wherein the means for recovering the honey include a box and a grate disposed under the sleeve over its entire length.

5. Device according to claim 1, wherein the feed hopper includes a pre-dripping grate.

6. Device according to claim 5, wherein the pre-dripping grate is inclined and includes means for adjusting its inclination.

7. Device according to claim 5, wherein the pre-dripping grate includes magnetized bars for retaining metallic particles.

8. Device according to claim 1, wherein the screw is mounted in rotation with respect to the frame by means of a bearing and is fixed in a longitudinal translational direction so as to assure the picking up of stresses.

* * * * *